United States Patent
Farrage, Jr. et al.

(10) Patent No.: US 8,980,426 B2
(45) Date of Patent: Mar. 17, 2015

(54) PEEL-AND-SET TILE SYSTEM

(76) Inventors: David J. Farrage, Jr., Costa Mesa, CA (US); Alan Keith Bowden, Fort Wayne, IN (US); Kevin Thomas Broderick, Taft, TN (US)

( * ) Notice: Subject to any disclaimer, the term of this patent is extended or adjusted under 35 U.S.C. 154(b) by 0 days.

(21) Appl. No.: 13/990,951

(22) PCT Filed: Dec. 2, 2011

(86) PCT No.: PCT/US2011/063131
§ 371 (c)(1),
(2), (4) Date: May 31, 2013

(87) PCT Pub. No.: WO2012/075427
PCT Pub. Date: Jun. 7, 2012

(65) Prior Publication Data
US 2013/0284355 A1    Oct. 31, 2013

Related U.S. Application Data

(60) Provisional application No. 61/419,350, filed on Dec. 3, 2010.

(51) Int. Cl.
*B32B 37/02* (2006.01)
*E04F 13/08* (2006.01)

(52) U.S. Cl.
CPC ......... *E04F 13/0885* (2013.01); *E04F 13/0862* (2013.01); *B32B 37/02* (2013.01)
USPC ...................................... 428/343; 428/355 R

(58) Field of Classification Search
CPC ... E04F 13/0862; E04F 13/0885; B03B 37/02
USPC ............................................. 428/343, 355 R
See application file for complete search history.

(56) References Cited

U.S. PATENT DOCUMENTS 4,561,232 A * 12/1985 Gladden et al. ................. 52/385

FOREIGN PATENT DOCUMENTS

JP          2002129731  A *  5/2002

OTHER PUBLICATIONS

Translation of JP 2002-129731.*

* cited by examiner

*Primary Examiner* — Victor Chang
(74) *Attorney, Agent, or Firm* — Jacque R. Wilson

(57) ABSTRACT

A peel-and-set tile system is disclosed for being installed onto a substrate, along with a corresponding method of manufacture and installation. The system provides, in an exemplary embodiment, a tile body. An underside surface of the tile body provides a contact adhesive array for securing the tile body to the substrate, the contact adhesive array being positioned and configured for forming a perimeter gasket continuously about a perimeter of the underside surface of the tile body when it is secured to the substrate. A peel-away release liner is applied over the contact adhesive array and configured to be removed therefrom when the tile body is to be installed onto the substrate. When the tile body is secured to the substrate, the perimeter gasket forms a bond that substantially prevents liquid or contaminants from getting between the underside surface of the tile body and the substrate or compromising the installation.

12 Claims, 3 Drawing Sheets

PEEL-AND-SET TILE SYSTEM

RELATED APPLICATIONS

This application claims priority and is entitled to the filing date of U.S. Provisional application Ser. No. 61/419,350, filed Dec. 3, 2010 and entitled "Peel-and-Set Tile System." The contents of the aforementioned application are incorporated herein by reference.

INCORPORATION BY REFERENCE

Applicants hereby incorporate herein by reference any and all U.S. patents and U.S. patent applications cited or referred to in this application.

TECHNICAL FIELD

Aspects of this invention relate generally to tiles, and more particularly to peel-and-set tile systems involving ceramic, stone, glass, and other such relatively hard tiles.

BACKGROUND ART

By way of background, ceramic, porcelain, and other such glazed and fired tiles have been known and used in building construction for decades. To date, the installation of such tiles has been a very labor-intensive process, usually involving messy mortar, cement, or other such bonding agent that require a sufficient drying or cure time. Generally, the smoother and harder the surface, the more difficult the bond and thus the stronger the bonding agent must be to insure a strong and reliable installation. With porcelain tiles, this is a particular challenge, often requiring a separate acrylic or polymer to help the tiles stick, reducing their practical usage despite the tiles otherwise being very attractive and durable.

The following art defines the present state of this field:

U.S. Pat. No. 2,760,881 to Toulmin, Jr. is generally directed to a tile member comprising a glass fiber sheet having a ceramic coating on the upper surface thereof, and a suitable adhesive backing on the under surface thereof. The ceramic surface of the tile may contain a patter of grooves if so desired. The adhesive layer on the under surface of the tile member is optional, but is preferable if the tile member is to be used as a wall or ceiling covering.

U.S. Pat. No. 3,583,889 to Califano et al. is generally directed to an apparatus for the production of adhesive-backed tile products. Tile products from a stack are moved in succession by a conveyor at a constant speed and in uniformly spaced relationship. A web of adhesive-coated protective material is applied over the moving tile products and bonded thereto. This web is then severed between each adjacent tile product by a cutting knife thereby producing an adhesive coated tile product with a protective sheet thereon which is removed when the tile products are installed.

U.S. Pat. No. 3,962,504 to Sherwin is generally directed to fired ceramic tiles having a rear surface provided with a series of fine ribs but is otherwise substantially planar that are attachable to a wall or similar surface, without the need to apply a fixative to the surface, by reason of a plurality of bodies of adhesive material distributed over the rear surface of the tile body and projecting therefrom to a thickness of 0.75 to 1 mm., the adhesive being a pressure-sensitive adhesive and being of such a nature that it will retain its coherent form both prior to and after mounting of the tile and will not flow or spread appreciably, each body of adhesive extending over a plurality of said ribs which are embedded therein, having a flat outer surface and being spaced from adjacent bodies of adhesive and from the edges of the tile body, and the adhesive material being protected by a peel-off film.

U.S. Pat. No. 4,079,554 to Terwilliger is generally directed to a simulated exterior surface assembly for creating the appearance of brick, stone, or the like. A sheet of plastic material, preferably vinyl, is provided with a series of simulated brick face sections or the like, defined by lines of weakening, where such sections are separable one from another by ordinary flexing. The sheet is provided with a peel-away self-adhesive allowing the simulated sections to be readily adhered onto a suitable undersurface. An optional arrangement includes the use of a mortar colored vinyl self-adhering backing material which is first placed on the undersurface and thereafter the individual simulated sections are suitably disposed thereon.

U.S. Pat. No. 4,554,769 to Fujii et al. is generally directed to an adhesive-backed tile panel protected by a release sheet. The prefabricated the panel comprises a substrate sheet composed of a core fabric and a heat-softening-adherent asphalt composition applied to the both surfaces of the fabric; an adhesive layer having convex and concave portions such as stripes of an adhesive not flowable but sticky at an ambient temperature; and tiles arranged regularly and secured to the asphalt composition layer of the substrate sheet. The convex portions and concave portions of the adhesive layer constitute the gaps through which air present between the tile panels and a substrate board can be purged upon installation of the tile panels. The tile panels can be installed readily on a substrate board having thereon horizontal indication means such as crosspieces by removing the release sheet, mounting the tile panels on the substrate board, and pressing the mounted the panels to purge air present between the panels and the board through the gaps of the adhesive layer and to increase the effective adhesion areas of the adhesive layer. A unit substrate board having specified structures for assembling a preferred substrate board is also provided for installation of the tile panels.

U.S. Pat. No. 4,804,569 to Arisawa is generally directed to a unit tile comprising a tile member of a desired shape and thickness, which is made of a synthetic resinous material having flexibility, an adhesive layer formed on a rear side of the tile member, and a release paper attached to the surface of the adhesive layer to cover and protect the adhesive surface. The unit tile is formed of a plurality of tile members. The tile members are disposed on a thin, flexible substrate, leaving spaces corresponding to joints between the respective tile members. The rear side of the substrate has the adhesive layer which is covered by the release paper. This unit tile may have marginal portions usable as overlaps for splicing. With such a configuration of the unit tile, the unit tile may easily and accurately set on walls etc., while conforming it to the configuration of the setting walls etc.

U.S. Pat. No. 5,989,369 to Light is generally directed to a porcelain address tile that is bonded directly to the exterior surface of a brick wall with a structural adhesive. In order to hold the tile in place while the structural adhesive cures, a double-sided (peel and stick) adhesive material is applied to the rear surface of the porcelain tile. According to another embodiment of the present invention, a decorative construction module in the form of an address tile for incorporation into the wall of a structure includes a porcelain tile measuring approximately ⅜ inch thick which has an outer surface inscribed with name/number and/or address information thereon and a backing block fabricated out of expanded polystyrene material and being bonded to the porcelain tile in order to create the completed module. The rectangular solid form of the module is sized and shaped so as to fit appropriately within a residential brick wall based upon the typical brick sizes and spacing of the mortar joints.

Japanese Patent Application No. 2001207619A to Sunasawa et al. is generally directed to a self adhesive tile set simple to peel the tile and capable of sufficiently displaying adhesion force even when the method for forming one opposite tile and an applying face different in the other adhesive pattern is adopted. In the self adhesive the set wherein other kinds of adhesives are applied on the rear faces of the two tiles respectively and which is supplied in a state where the rear faces of both the tiles are stuck, one adhesive is a water soluble adhesive and/or an emulsion adhesive, the other adhesive is a solvent adhesive, if the respective adhesives are stuck on the adhesive faces, they are stuck, can be simply peeled by hands, and the respective adhesives remain on the respective applied face.

Japanese Patent Application No. 2001295449A to Iwai is generally directed to a tile, a tile panel and a tiling structure facilitating installation and removal of the tile and the tile panel to enable them to be easily replaced many times. The tile has viscous elements affixed to its back. A dry joint bar is interposed between vertically adjoining tiles and when they are affixed to a wall face. The viscous element should preferably have a thickness of 1 to 5 mm, particularly 2 to 5 mm, a Shore hardness of 5 to 35°, and a 180° peeling adhesive strength of 1.5 N/25 mm to 20 N/25 mm.

European Patent No. 2,066,853 and U.S. Patent Application Publication No. 2009/0233034 to Saunders et al. are generally directed to a tiling adhesive application system comprising a backing sheet with a series of parallel grooves extending thereacross and each carrying a bead of tiling adhesive. A release sheet is bonded to the edge margins of the backing sheet to form a sealed package. The backing sheet is transparent and of the same size as a tile to be adhered to a wall. The release sheet is peeled away to expose the adhesive which is then applied to the wall while carried by the backing sheet, whereafter the backing sheet is lifted away from the wall leaving the adhesive ready to bond a tile to the wall.

While the prior art described above teaches, among other things, tiles having a pressure sensitive adhesive with a peel-away layer, it fails to teach such a tile having, in certain embodiments, a contact adhesive array positioned and configured for forming a perimeter gasket continuously about a perimeter of an underside surface of the tile when it is secured to a substrate. Furthermore, the prior art fails to teach the substrate being coated, in certain embodiments, with a bond enhancer configured for providing an etched-like surface on the substrate for an improved, hook-and-loop fastening type engagement with the tile. Aspects of the present invention fulfill these needs and provide further related advantages as described in the following disclosure.

DISCLOSURE OF INVENTION

Aspects of the present invention teach certain benefits in construction and use which give rise to the exemplary advantages described below.

What is proposed according to aspects of the present invention is a peel-and-set approach to ceramic, porcelain and other hard tiles, which is heretofore unknown in the marketplace in any practical or effective system. Essentially, in an exemplary embodiment, after the tile is formed, in a secondary factory operation a contact adhesive array is applied to the back of each tile or mosaic of tiles. A peel-away laminate or layer is then applied over the adhesive, which is later removed for installation of the tile(s). To further facilitate installation of the tile(s), and particularly adhesion of the contact adhesive to the substrate on which the tile(s) is to be installed, the substrate is first coated with a bond enhancer that has a "Velcro" effect when in contact with the adhesive, further strengthening the bond between the tile and the underlying surface.

Other features and advantages of aspects of the present invention will become apparent from the following more detailed description, taken in conjunction with the accompanying drawings, which illustrate, by way of example, the principles of aspects of the invention.

BRIEF DESCRIPTION OF DRAWINGS

The accompanying drawings illustrate aspects of the present invention. In such drawings.

MODES FOR CARRYING OUT THE INVENTION

The below described drawing figures illustrate aspects of the invention in at least one of its exemplary embodiments, which are further defined in detail in the following description.

Figure 1:
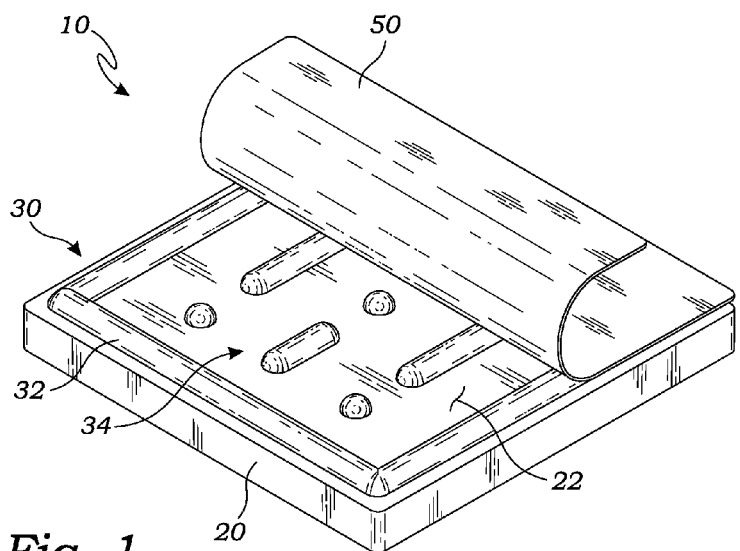
FIG. 1 is a perspective view of an exemplary embodiment of a peel-and-set tile apparatus.

With reference to the perspective view shown in FIG. 1 of an exemplary peel-and-set tile apparatus 10 according to aspects of the present invention, the tile apparatus 10 includes a tile body 20, a contact adhesive array, generally denoted as 30, applied to the underside surface 22 of the tile body 20, and a release liner 50 applied over the contact adhesive array 30 substantially parallel to the underside surface 22 of the tile body 20 and configured to be removed therefrom when the tile apparatus 10 is to be installed on a substrate 60, more about which is said below. Once more, the tile body 20 may be ceramic, porcelain, or any other relatively hard tile now known or later developed. While the tile body 20 is shown as being substantially square and measuring approximately four inches by four inches (4"×4"), it will be appreciated that other shapes and sizes, such as a rectangle of various dimensions, may be employed in the peel-and-set tile system of the present invention without departing from its spirit and scope.

Figure 2:
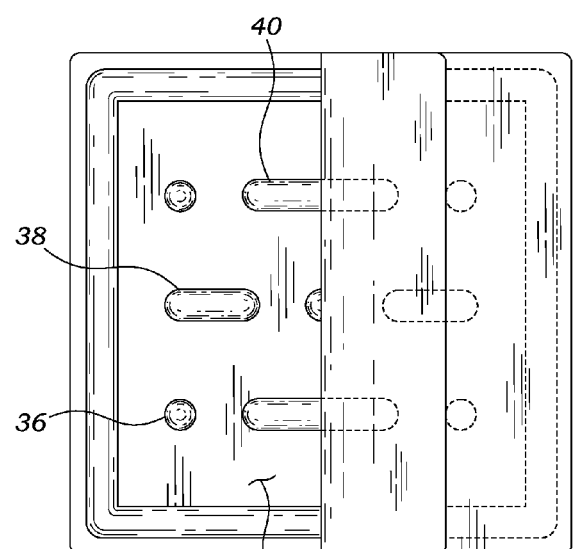
FIG. 2 is a top view thereof.

As shown in FIG. 1, and with further reference to the top view of FIG. 2, in the exemplary embodiment wherein a single tile body 20 is employed, versus a mosaic sheet, more about which is said below particularly in connection with FIGS. 4-7, the contact adhesive array 30 formed on the underside surface 22 of the tile body 20 generally comprises a continuous perimeter gasket 32 and an infill pattern, generally denoted as 34, bounded by the perimeter gasket 32. It will be appreciated by those skilled in the art that the continuous perimeter gasket 32 is configured to form a complete perimeter about the underside surface 22 of the tile body 20 when it is pressed into place on the substrate 60, thereby forming a bond that will not allow water or other liquids or contaminants to get behind the tile body 20 once installed, or between the underside surface 22 of the tile body 20 and the substrate 60, and thereby compromise the installation. It will be further appreciated that the infill pattern 34 is one of a variety of spaced-apart contact adhesive patterns on the underside surface 22 of the tile body 20 to help insure a good bond of the central area of the tile body 20 to the substrate 60, such that the particular infill pattern 34 shown as being comprised of contact adhesive dots 36, contact adhesive small bars 38, and contact adhesive large bars 40 is to be understood as being merely illustrative of aspects of the present invention and not limiting. By way of further example, a pattern of just dots or just bars of one or more sizes could be employed, as could a single continuous coat—preferably applied in a swirl pattern—or layer of contact adhesive rather than a defined perimeter separate from an infill pattern. Preferably, at least the perimeter of the contact adhesive array 30 of whatever configuration would be continuous, again, so as to prevent the passage of moisture or contaminants into the space behind the tile body 20 between its underside surface 22 and the substrate 60 on which the tile body 20 is installed. In the exemplary embodiment, the entire contact adhesive array 30, or both the continuous perimeter gasket 32 and the infill pattern 34, is formed of a hot melt pressure sensitive adhesive ("HMPSA") that is applied to the underside surface 22 of the tile body 20 using a hot-roller process, which HMPSA material insures stability for the pre-installation period and the life of the product once installed. As shown in the side view of the tile apparatus 10 of FIG. 3, the perimeter gasket 32 and the infill pattern 34 are preferably of the same size or contact adhesive bead height, in the exemplary embodiment being at least 2.2 mm or roughly 0.1", though the size and height of the contact adhesive array 30 may also vary depending on, for example, the type of the body (material, underside surface roughness, and overall size and shape and hence weight), details of the installation (vertical or horizontal orientation and degree of the spacing), and the type and surface treatment of the substrate 60. The ability to alter the HMPSA according to application/thickness and weight allows the present system to accommodate various sizes of tile. Moreover, those skilled in the art will appreciate that other contact or pressure-sensitive adhesives of various kinds, whether now known or later developed, and in various patterns and thicknesses may be employed in the peel-and-set tile system according to aspects of the present invention without departing from its spirit and scope. With continued reference to FIGS. 1-3, the release liner 50 is in the exemplary embodiment a silicone coated material that is applied to the back of each treated the body 20 in contact with the contact adhesive array 30 to assist in the packaging and handling of each finished the apparatus 10. It will be appreciated that the silicone coating facilitates the removal of the liner 50 from the tile body 20, and the contact adhesive array 30 particularly, when the tile apparatus 10 is to be installed on the substrate 60, but that other materials and coatings thereon both now known and later developed may be employed in the release liner 50 without departing from the spirit and scope of the present invention.

Figure 3:
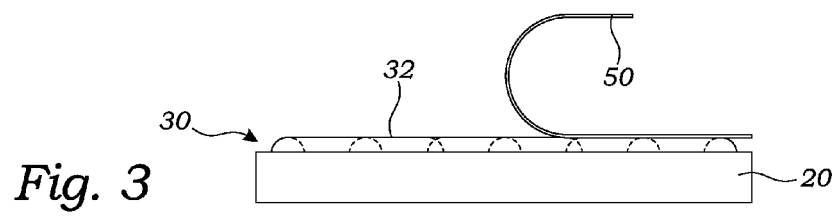
FIG. 3 is a side view thereof.
Figure 4:
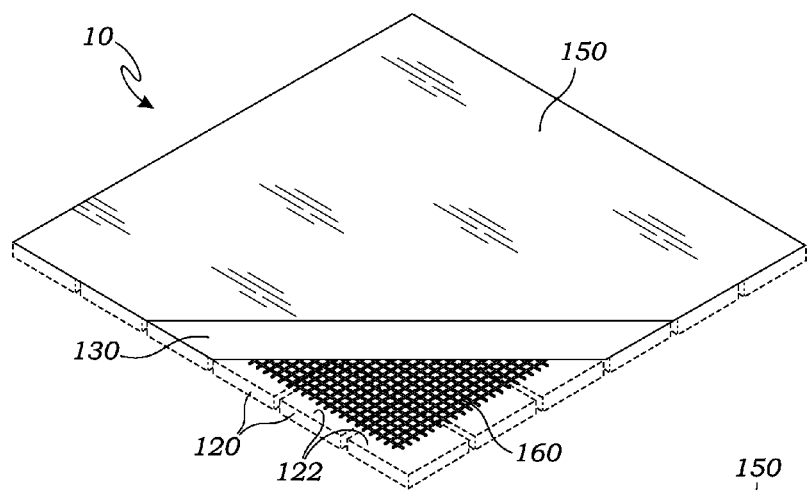
FIG. 4 is a perspective view of a further exemplary embodiment of a peel-and-set tile apparatus, employing a mosaic sheet tile comprising multiple tile bodies.
Figure 8:
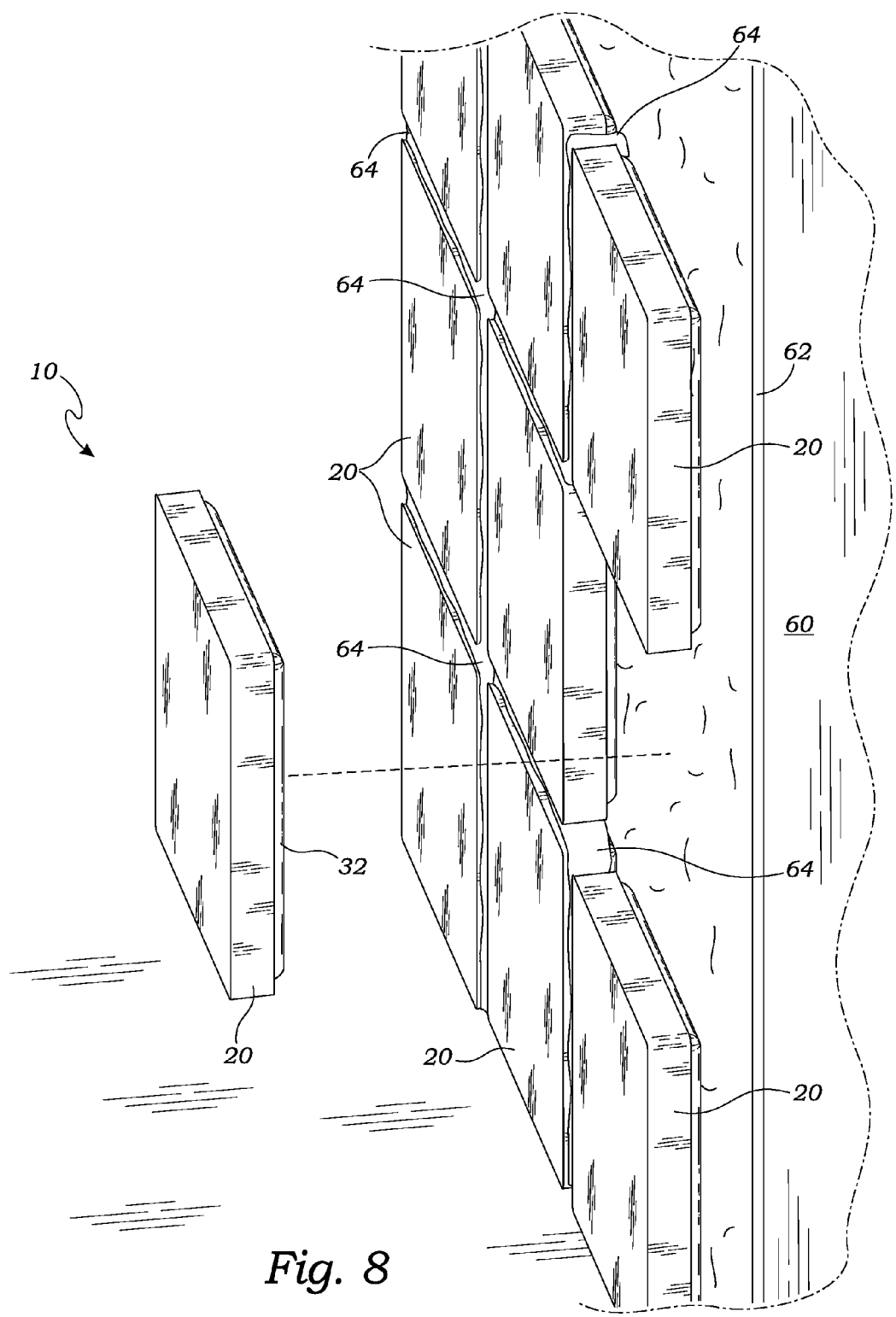
FIG. 8 is a perspective view of the exemplary peel-and-set tile apparatus being installed onto a substrate.

As illustrated in FIG. 8, to further facilitate installation of such a tile apparatus 10 as shown and described in connection with FIGS. 1-3, and particularly adhesion of the contact adhesive array 30 formed on the underside surface 22 of the tile body 20 to the substrate 60 on which the tile apparatus 10 is to be installed, the substrate 60, in the exemplary embodiment, is first coated with a bond enhancer 62 that has a hook-and-loop fastening effect when in contact with the contact adhesive array 30, further strengthening the bond between the tile body 20 and the underlying substrate 60. The bond enhancer 62 is preferably a "high solids" content primer with acceptable sheer strength, such as latex, so as to also dry relatively quickly and provide a relatively "sticky" surface, or an uneven surface on the micron level, somewhat analogous to a surface that has been polished and then etched. It will be appreciated that the substrate 60 so treated with such a high solids bond enhancer 62 will thus cover over or coat any loose particles on the substrate 60 that would weaken any bond while at the same time providing an "etched-like" surface for improved bonding or mechanical engagement thereto by the HMPSA or other contact adhesive array 30. The bond enhancer 62 may be applied to the substrate 60 with a sponge roller, a sprayer, or any other suitable equipment and technique now known or later developed. Again, given adequate drying time, the bond enhancer 62 provides a barrier that secures any loose fiber or particles to the substrate 60 as well as insuring improved bond characteristics for the tile body 20 when applied.

In use, then, the surface on which the tile apparatus 10 is to be installed need only be relatively smooth and dirt/dust free so as to get sound adhesion. The substrate 60 can be traditional wall tile surfaces, including paper-faced gypsum board (painted, primed or unfinished), cement backer boards or fiber backer boards, for example. Preferably, once again, the surface of the substrate 60 is primed with the bond enhancer 62 to etch and waterproof it, making it ready for the tile installation, particularly in a bath or kitchen application where there will be significant moisture exposure. Once the substrate 60 is thus prepped, the peel-away release liner 50 on the back of the tile apparatus 10 is simply removed and the tile body 20 stuck in position by pressing the contact adhesive array 30 against the substrate 60. Preferably, the installed tiles 20 are grouted with a flexible grout 64 to achieve maximum bond and strength, which can be done immediately after placing the tiles 20 rather than waiting twenty-four hours or more for mortar to set as in conventional tile installations. It will thus be appreciated that such a process is simpler than dealing with mortar, concrete or other such bonding agents and, as testing has proven, is equally or more durable as well. Specifically, the present system is designed to overcome the convex and concave natural variations in ceramic, stone and glass tiles. It also overcomes flatness and composition variances and requires no wet mortars or trowel applied setting pastes, the HMPSA or other contact adhesive applied as described herein adequately not only taking up such variances but actually meeting or exceeding the coverage requirement per ANSI standards, again, without the need for mortar or the like.

Figure 5:
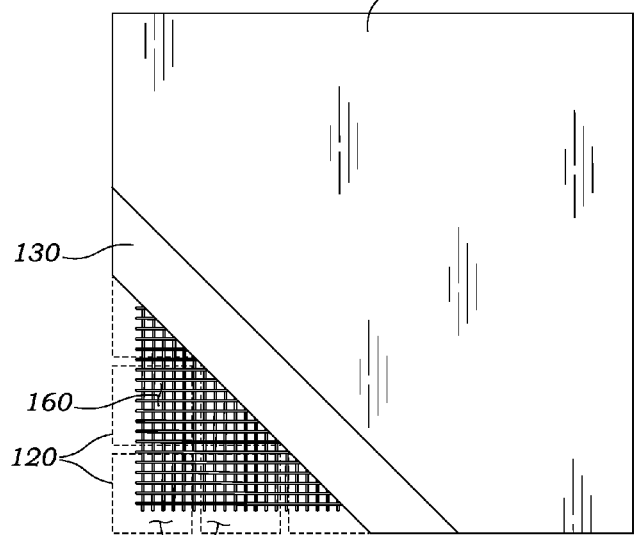
FIG. 5 is a top view thereof.
Figure 6:
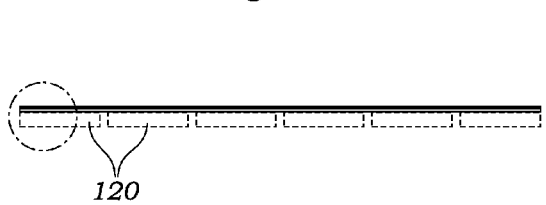
FIG. 6 is a side view thereof.
Figure 7:
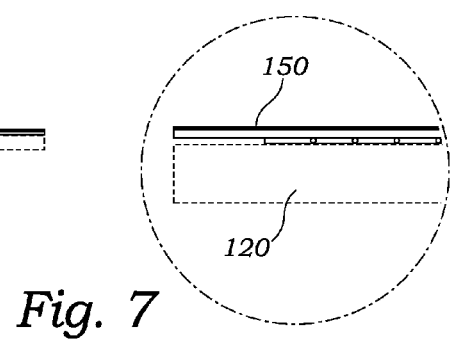
FIG. 7 is an enlarged partial side view thereof.

Turning now to FIGS. 4-7, there is shown an alternative tile system, according to aspects of the present invention, wherein a single mosaic sheet tile apparatus 110 comprising multiple tile bodies 120 is employed. In such a system, as best shown in the perspective view of FIG. 4, a group of spaced-apart tile bodies 120, here a six-by-six (6×6) matrix, for example, is held together as a single mosaic sheet by first laying against the underside surfaces 122 of the tile bodies 120 a binding mesh 160 and then applying as a single coat thereover—preferably in a swirl pattern—the contact adhesive array 130. It will be appreciated that the contact adhesive array 130, as again, for example, being an HMPSA material that is applied through a hot roller process, with the appropriate temperatures and pressures, will upon initial application partially flow in and through the openings in the binding mesh 160 so as to simultaneously stick to and affix the binding mesh 160 to the underside surfaces 122 of the tile bodies 120 while also leaving sufficient contact adhesive 130 above the binding mesh 160, or on the side of the binding mesh 160 opposite the tile bodies 120, so as to provide for the installation of the mosaic sheet tile apparatus 110 to the substrate 60 in a manner analogous to that described above in connection with FIGS. 1-3 and a single tile apparatus 10. Accordingly, to prepare the mosaic sheet tile apparatus 110 for storage and transport prior to use, and particularly to guard the contact adhesive array 130 applied to the backs of the individual tile bodies 120 over the binding mesh 160, a silicone coated release liner 150 or the like is again removably applied over the contact adhesive array 130 substantially parallel to the binding mesh 160 and the mosaic of tile bodies 120. In use, once the substrate 60 or surface on which the mosaic sheet tile apparatus 110 is to be installed is prepped, the release liner 150 is simply removed and the mosaic sheet tile apparatus 110 is positioned and pressed into place on the substrate 60. It will again be appreciated by those skilled in the art that by not having to apply mortar, concrete, or other such material to the substrate 60 in order to install the tiles and then wait on the mortar to set before finishing the installation, tremendous gains in efficiency and simplicity are realized through the peel-and-set tile system according to aspects of the present invention, whether installed as pre-fabricated single tiles or mosaic tile sheets, either way having an HMPSA or other contact adhesive array conveniently pre-applied to the backs of the tiles and preserved until installation through a removable release liner. It will once again be appreciated that the contact adhesive array being continuous at least about the perimeter of each tile back 122, and in the case of the mosaic sheet tile apparatus 110 being a substantially continuous layer over the backs of all the tile bodies 120, serves to form a stronger initial bond through adequate surface-to-surface contact with the underlying substrate 60 and to render such bond longer lasting by substantially preventing moisture or other contaminants to get behind the tiles, between the tile bodies 120 and the substrate 60. To complete the installation, which again can be done immediately after the peel-and-set tiles 110 are pressed into place on the substrate 60, a flexible grout 64 or the like may be applied between the tiles 120 to further anchor and seal the tiles 120 in place. It is noted that the top view of the mosaic sheet tile apparatus 110 of FIG. 5 shows much the same details as FIG. 4, while FIGS. 6 and 7 provide a side view and an enlarged partial side view, respectively, of the same exemplary mosaic sheet tile apparatus 110 of FIGS. 4 and 5.

Based on the foregoing, it will be appreciated that there is herein disclosed a convenient and efficient peel-and-set tile system wherein individual tiles or mosaic sheets (tiles attached together on a fiber mesh sheet) are pre-treated with a continuous application of a hot melt pressure sensitive adhesive ("HMPSA") or other such contact adhesive array at least about the perimeter of the underside surface of each tile body, which insures stability for the pre-installation period and the life of the product once installed. Upon removal of a release liner, such pre-fabricated tiles can then simply be pressed onto a prepared surface by hand and so achieve a permanent bond. The HMPSA or other contact adhesive being applied in a substantially continuous array, whether by hand on individual tiles or by continuous roll coat over tiles or mosaic sheets, provides a gasket effect about the entire perimeter of the tile back as shown, which seals the backs of the tiles against bond failure due to hydrostatic pressure or other contaminants that may breach the space between tile and substrate. The characteristics of the HMPSA, together with the bond enhancer, insure a strong and secure bond.

To summarize, regarding the exemplary peel-and-set tile system of the present invention as employed in connection with ceramic, porcelain and other relatively hard tiles, it will be appreciated that a system is provided for relatively simple and efficient installation of such tiles by avoiding the use of mortars and the like and their associated set times and at the same time providing a press-on permanent bond that by its mechanical and geometric properties is yet relatively stronger and less prone to failure. Because the principles of the invention may be practiced in a number of configurations of the peel-and-set the system beyond those shown and described, it is to be understood that the invention is not in any way limited by the exemplary embodiments and is able to take numerous forms without departing from the spirit and scope of the invention.

It should be noted that the various features of each of the above-described embodiments may be combined in any logical manner and are intended to be included within the scope of the present invention. It will also be appreciated by those skilled in the art that the present invention is not limited to the particular geometries and materials of construction disclosed, but may instead entail other functionally comparable structure, now known or later developed, without departing from the spirit and scope of the invention. Furthermore, while aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventors believe that the claimed subject matter is the invention.

What is claimed is:

1. A peel-and set tile apparatus configured for being installed onto a prepared substrate, the apparatus comprising:
   a tile body;
   an underside surface of the tile body providing a contact adhesive array for securing the tile body to the substrate, the contact adhesive array positioned and configured for forming a perimeter gasket continuously about a perimeter of the underside surface of the tile body when it is secured to the substrate; and
   a peel-away release liner applied over the contact adhesive array, substantially parallel to the underside surface of the tile body and configured to be removed therefrom when the apparatus is to be installed onto the substrate;
   whereby, with the tile body secured to the substrate, the perimeter gasket forms a bond that substantially prevents liquid or contaminants from getting between the underside surface of the tile body and the substrate or compromising the installation.

2. The peel-and-set tile apparatus of claim 1, wherein the contact adhesive array further provides an infill pattern bounded by the perimeter gasket, the infill pattern configured for assisting in securing a central area of the tile body to the substrate.

3. The peel-and-set tile apparatus of claim 2, wherein the infill pattern is one of a variety of spaced apart contact adhesive patterns on the underside surface of the tile body.

4. The peel-and-set tile apparatus of claim 3, wherein the contact adhesive patterns comprise at least one of contact adhesive dots, contact adhesive small bars, and contact adhesive large bars.

5. The peel-and-set tile apparatus of claim 2, wherein each of the perimeter gasket and infill pattern are of the same size or contact adhesive bead height.

6. The peel-and set tile apparatus of claim 1, wherein the contact adhesive array is formed of a hot melt pressure sensitive adhesive.

7. The peel-and-set tile apparatus of claim 1, wherein the release liner is a silicone coated material.

8. The peel-and-sent tile apparatus of claim 1, wherein the tile body is comprised of a plurality of spaced-apart mosaic tile bodies.

9. The peel-and-set tile apparatus of claim 8, wherein the mosaic tile bodies are held together as a single mosaic sheet of a binding mesh positioned between the underside surfaces of the tile bodies and the contact adhesive array.

10. A peel-and set tile system comprising:

An at least one tile body;

A substrate on which the at least one tile body is to be installed, the substrate coated with a bond enhancer configured for providing an etched-like surface on the substrate for improved engagement with the tile body;

an underside surface of each of the at least one tile body providing a contact adhesive array for securing the tile body to the substrate, the contact adhesive array positioned and configured for forming a perimeter gasket continuously about a perimeter of the underside surface of the tile body when it is secured to the substrate; and a peel-away release liner applied over the contact adhesive array, substantially parallel to the underside surface of the at least one tile body and configured to be removed therefrom when the tile body is to be installed onto the substrate;

whereby, with the at least one tile body secured to the substrate, a hook-and-loop fastening effect is achieved between the bond enhancer and contact adhesive array for strengthening the bond between the tile body and substrate, while the perimeter gasket forms a bond that substantially prevents liquid or contaminants from getting between the underside surface of the tile body and the substrate or compromising the installation.

11. The peel-and-set tile system of claim 10, wherein the bond enhancer is a high solids content primer with sufficient sheer strength to maintain the bond with the contact adhesive array.

12. The peel-and-set tile system of claim 10, further, comprising, a flexible grout formed about each of the at least one tile body and configured for strengthening the bond between the tile body and substrate.

* * * * *